Nov. 22, 1949　　　W. D. TEAGUE, JR　　　2,488,648
SUCTION THROTTLING VALVE
Filed March 15, 1946
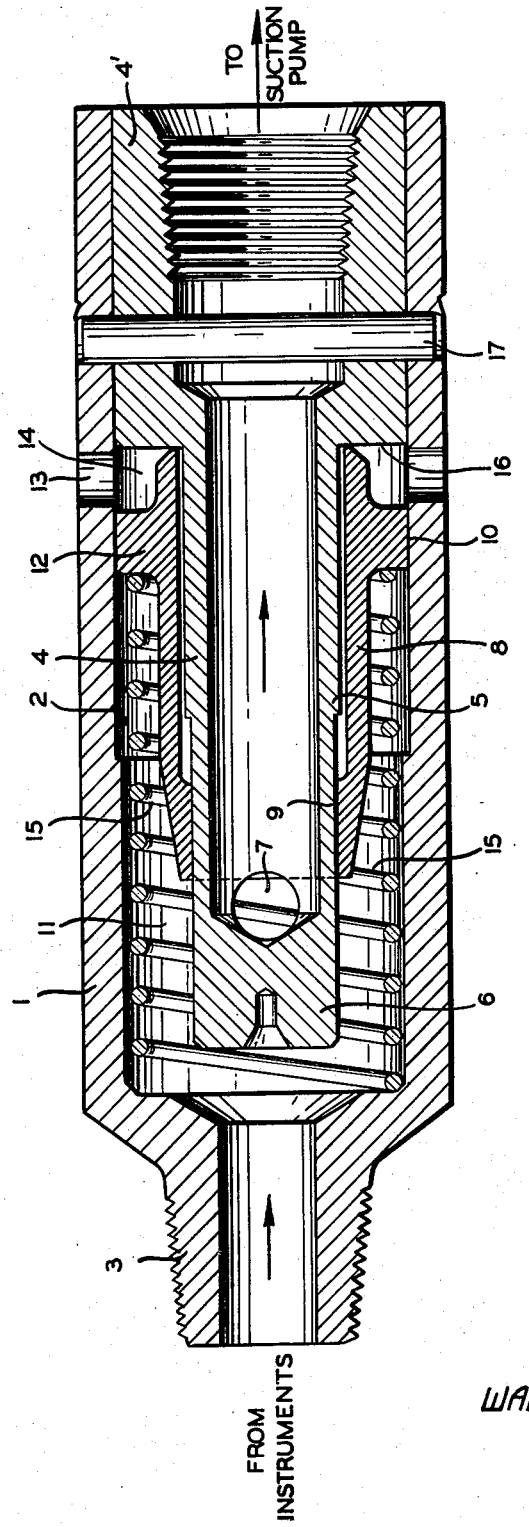
-INVENTOR-
WALTER D. TEAGUE, JR.
BY E. S. Smith
-AGENT- Patented Nov. 22, 1949

2,488,648

UNITED STATES PATENT OFFICE 2,488,648

SUCTION THROTTLING VALVE

Walter D. Teague, Jr., Alpine, N. J., assignor to Bendix Aviation Corporation, Teterboro, N. J., a corporation of Delaware Application March 15, 1946, Serial No. 654,656

3 Claims. (Cl. 137—153)

My invention relates to suction control valves and more particularly to valves of the throttling type. This application is a continuation in part as to all common subject matter of my U. S. application Serial No. 563,769, filed November 16, 1944 and of my U. S. application Serial No. 566,677, filed December 5, 1944 and now U. S. Patent No. 2,473,620, granted June 21, 1949 and assigned to Bendix Aviation Corporation. The feature claimed herein including a throttling valve piston having respective inner and outer guiding surfaces at opposite ends thereof is disclosed but not claimed in the aforenoted U. S. Patent No. 2,473,620.

One of the objects of my invention is to provide such a valve which is of utmost simplicity and minimum weight and yet suited for the highly sensitive control of a suction pressure, whereby instruments and devices of high accuracy may be operated to provide high precision performance.

Another object of my invention is to provide such a valve which is suited to mass production methods and operating accurately and reliably in spite of practical tolerance limits, particularly as to the concentricity of ideally concentric cylindrical parts.

Referring to the drawing, this is a longitudinal view, generally in section, of an air suction throttling valve constructed in accordance with my invention.

In the form of the invention disclosed by way of example, the valve is an air suction throttling type adapted to be applied in a system including various air-operated instruments and devices. When so employed, it is located in the system between an air suction pump and the instrument or device to be operated whereby the air suction on the device is regulated to substantially maintain a desired suction, one example of its many uses being the control of a constant air suction in the instrument-suction line of an aircraft or the like.

As thus disclosed, the valve has a casing 1 having a female cylindrical portion 2 and a male threaded end portion 3 which is adapted to be connected with a suitable coupling in the suction line (not shown). Within the female cylinder 2 is inserted the male element 4 which has an outer end portion 4' closely fitting within the cylindrical portion 2. Member 4 also has a cantilever-like male cylindrical portion 5 which is substantially concentric with the cylinder 2 of the casing 1. Element 4 has a cup-end portion 6 which is clear of the adjacent end portion 3 of the casing 1 to provide a flow passage between the casing 1 and the element 4. Element 4 has a pair of port-openings 7 near its cup-end 6, one appearing in the sectional view, which are to be throttled to control the flow through the valve and hence the suction in the instrument line which is coupled with the casing 1 at its end 3.

The annular piston valve 8 is introduced into the space between the cylinders 2 and 5 and is constructed to be relatively slidable between them. To enable the use of practical production tolerances, especially of concentricity, the piston valve 8 has only its land 9 closely fitting at the inner surface of the piston and only its land 10 closely fitting at the outer surface of the piston, with a substantial axial distance between the lands 9 and 10.

To provide a reference basis for the control of suction in space 11 on the instrument side of the annular piston wall 12, an opening 13 to atmosphere is made in the cylindrical wall 2 of casing 1, thus admitting atmospheric pressure to the space 14 on the other side of the annular piston 12. To oppose the resultant differential pressure across the piston 12, spring 15 is inserted in the space 11 with one of its ends abutting casing 1 and the other end abutting the annular wall 12 of piston 8. The free length and stiffness of the spring 15 are so selected as to bring the lefthand end of land 9 into throttling relation with port-openings 7 when the suction is at the desired value, a shoulder 16 on the large-dameter end of the element 4 coacting with the righthand end of piston 8 to limit the travel of the valve relative to the port-openings 7 to keep within the range of the effective throttling relation.

A pin 17 is inserted through holes in casing 1 and element 4 to retain element 4 in position after the parts have been put together in the aforedescribed relationship. Before being assembled, the mating surfaces at 2 and 4' are coated with a sealing lacquer, for example. After the valve has been tested satisfactorily, the sides are staked over lightly at one place on each side as shown to retain the pin 17 in position. This construction provides an extremely inexpensive and light-weight suction valve which is both reliable and accurate for effecting precise yet stable suction control.

In operation, a large increase of the suction in the suction pump line would result in a like large increase of the suction in the instrument line and in the space 11 if the valve 8 did not move. Actually the increase of the suction in space 11 increases the pressure differential across piston wall 12 to proportionally increase the force exerted by the piston on the spring 15 and hence the piston actually moves to the left until the increase of force is balanced by an increased force due to the increased compression of the spring 15. By this movement, the end of the valve 8 simultaneously partially closes the port-openings 7 to throttle the flow so that the resultant change of the suction in space 11 from the desired, or predetermined, value is so reduced as to be practically negligible in effect.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a throttling valve for fluid flowing through a conduit, the combination of a casing having a female cylindrical portion, a male element located within said portion and having an approximately concentric and smaller-diameter cylindrical portion with a port-opening therein, and an annular piston valve of substantial length slidably fitting both said casing and said element and having closely fitting axially-spaced raised cylindrical portions only on the inside near one end and on the outside near the other, said piston valve being disposed to have its smaller-diameter land portion cooperate with the port-opening in the element to throttle the flow therethrough.

2. In a throttling valve, the combination of a casing having a female cylindrical portion, an element mounted at one end within the casing with an inner male cylindrical portion of smaller diameter extending approximately concentrically within said female portion and its inner end closed and clear of the interior of the casing, and having a port-opening in its cylindrical wall adjacent its said inner end, the casing having an opening for a reference pressure in its cylindrical wall adjacent the stated mounting end of the element, an annular piston valve located intermediate said openings and having slidable sealing portions closely fitting said cylindrical surfaces of the casing and element only on the inside of the piston near one end thereof and on the outside near the other, and means biasing the valve in the direction to tend to uncover the port-opening against the force due to the differential pressure across the piston.

3. In a throttling valve for fluid flowing through a conduit, the combination of a generally cylindrical casing having one end connectable to one part of the conduit, a generally cylindrical element having an outer end portion constructed to closely fit within said cylindrical casing and to be connectable to another part of the conduit, said element also having a smaller diameter cup-portion with the inner end clear of the interior of the casing and a port-opening in its cylindrical wall adjacent its inner cup-end, fluid-tight means for securing said element to said casing, said casing having an opening to atmosphere in its cylindrical wall adjacent said outer end portion of said element, an annular piston valve slidably fitting said casing and element, said valve being located intermediate said openings and having closely fitting portions only on the inside of the piston near one end thereof and on the outside near the other respectively, and a spring operatively connecting said valve with said casing to continuously bias the valve in the direction to tend to uncover the port-opening against the force due to the differential pressure across the piston.

WALTER D. TEAGUE, Jr.

REFERENCES CITED

The following references are of record in the file of this patent:

UNITED STATES PATENTS

| Number | Name | Date |
| --- | --- | --- |
| 549,800 | Lipkowski | Nov. 12, 1895 |
| 556,419 | James | Mar. 17, 1896 |
| 833,441 | Caskey | Oct. 16, 1906 |
| 1,283,675 | Coleman | Nov. 5, 1918 |
| 1,966,493 | Fleming | July 17, 1934 |
| 2,102,833 | Carroll | Dec. 21, 1937 |